3,277,137
PROCESS FOR THE PREPARATION OF HALOGENATED ISOCYANATES
Eugene L. Powers, New Martinsville, W. Va., assignor to Mobay Chemical Company, Pittsburgh, Pa., a corporation of Delaware
No Drawing. Filed Apr. 19, 1963, Ser. No. 274,340
4 Claims. (Cl. 260—453)

This invention relates to halogenated isocyanates and more particularly to an improved method of preparing isocyanates which contain chemically combined halogen and preferably chlorine and/or bromine.

It has been proposed, theretofore, to prepare halogenated isocyanates, and particularly chlorinated isocyanates, by the method of U.S. Patent 2,945,875. For example, by following this method, a chlorinated isocyanate can be obtained which has a higher percentage of chlorine with as many as 2 or 3 of the remaining positions on the ring of the 2,4- and 2,6-toluylene diisocyanates becoming substituted with chlorine. The disadvantage of this process is not only that an additional processing step is necessary; but furthermore, carbamyl chloride is formed twice: once, in the phosgenation procedure and again, in the subsequent chlorination procedure. These must be decomposed by heat and the HCl removed from the reaction mixture in both stages.

It is also known that when isocyanates are subjected to heat for extended times that they tend to polymerize and the excess heat, which is present when the chlorination is carried out in a second step, causes an unnecessary amount of polymerization of the isocyanate groups.

It is, therefore, an object of this invention to provide a method of preparing isocyanates which contain aromatic rings bearing halogen atoms which are substantially devoid of the foregoing disadvantages. Another object of this invention is to provide a method of preparing chlorinated isocyanates. Still a further object of this invention is to provide a method of preparing halogenated isocyanates while avoiding undue polymerization of the —NCO groups. A further object of this invention is to provide an improved method of preparing halogenated aromatic isocyanates where better control can be exercised over the position substituted by the halogen atoms. Still, a further object of the invention is to eliminate processing steps in the preparation of halogenated aromatic isocyanates.

The foregoing objects, and others which will become apparent from the following description, are accomplished in accordance with the invention, generally speaking, by providing a method of preparing halogenated aromatic isocyanates which comprises simultaneously reacting an aromatic amine with chlorine and/or bromine and $COCl_2$, preferably in an inert organic solvent. The method of the invention involves dissolving an aromatic amine in an inert organic solvent therefor and then reacting said amine in said solvent simultaneously with $COCl_2$ and chlorine and/or bromine.

The reaction is preferably carried out in two stages by reacting the amine solution with phosgene; first at a low temperature and preferably below about 90° C. in a first step to prepare the carbamyl choride amine-hydrochloride and, then reacting this intermediate product at a higher temperature within the range from 90° C. to about 175° C. until the corresponding isocyanate is produced. With most amines the simultaneous bromination and/or chlorination may be carried out in either stage, or in both stages of the phosgenation reaction. However, when the amine used is 4,4'-diamino diphenyl methane, it is preferred to carry out the chlorination or bromination reaction in the second stage of the phosgenation to avoid undersirable side reactions.

Any suitable aromatic amine may be simultaneously phosgenated and chlorinated or brominated in accordance with the method of this invention including, for example, aniline, toluylamine, p-amine ethyl benzine, benzylamine, naphthylamine, p-amine aniline, meta-amino aniline, p-aminobenzylamine, 4,4'-diamino diphenyl methane, 2,4-toluylene diamine, 2,6-toluylene diamine, 2,3,5-benzene triamine, p,p',p"-triamine triphenylmethane, the crude mixture of polyphenyl amines prepared by the condensation of aniline with formaldehyde, and, particularly, that mixture of amines which results when aniline is reacted wtih formaldehyde in the presence of an acid and preferably HCl at a temperature of from about 90° C. to about 100° C.

By way of illustration, crude diphenyl methane diamine is the reaction of aniline and formaldehyde in the presence of HCl and contains some triamines and even higher polyamines. It may be prepared by reacting about 60 parts of aniline with about 25 parts of formaldehyde (37 percent aqueous) and about 74 parts of HCl (30 percent aquueous at a temperature of about 90° C. to about 100° C. for about 1.5 to about 2 hours. In order to separate out the crude amine, the acidic reaction mixture is reacted with an equivalent amount of sodium hydroxide and crude amine is separated from the salt layer. It is preferred to distill out any water and unreacted aniline before phosgenating and simultaneously chlorinating or brominating. Another crude amine which is also advantageously used is crude toluylene diamine which is prepared by a number of patented processes including the process disclosed in U.S. Patent 2,619,503. In accordace with one porcedure, toluene is first nitrated to prepare dinitrotoluene and then this product is reduced to the corresponding diamine. A preferred mixture of toluylene diamines is a mixture comprising about 80 percent 2,4- and about 20 percent 2,6-toluylene diamine.

Any suitable inert organic solvent may be used such as, for example, toluene, xylene, chlorobenzene, orthodichlorobenzene, tetrahydro naphthalene, benzene, cyclohexane, tetrachloroethylene, trichloroethylene, dimethyl ether of diethylene glycol, diethyl ether of diethylene glycol, dipropyl ether of diethylene glycol, dibutylether of diethylene glycol, methyl ethyl ether of diethylene glycol, methyl propyl ether of diethylene glycol, ethyl propyl ether of diethylene glycol, propyl butyl ether of diethylene glycol, and the like. However, it is preferred to use an organic solvent which will be reasonably inert to halogenation such as, orthodichlorobenzene, monochlorobenzene or tetrachloroethylene.

This method of preparing halogenated aromatic isocyanates subjects the resulting isocyanates to a minimum of heat. Moreover, better control can be exercised over the positions which are substituted by chlorine and/or bromine on the aromatic ring. In the old method of preparing chlorinated isocyanates, the reaction mixture had to be heated several times both to decompose the carbamyl chlorides and in order to speed up the reaction with the chlorine and/or bromine. The heating of the isocyanate was detrimental because of polymerization reactions.

A satisfactory organic polyisocyanate which contains chemically combined chlorine and/or bromine can be prepared by dissolving a suitable amine in an inert organic solvent and slowly adding the amine solution to a cold (about 0° C. to about 10° C.) phosgene solution while maintaining the temperature at a satisfactory low level, preferably below about 15° C. When sufficient phosgene has been added to prepare a carbamyl chloride-amine hydrochloride, the amine mixture is heated until it reaches a temperature above about 90° C. and then additional phosgene solution is added with the simultaneous addition of chlorine or bromine so that the conversion of the carbamyl chloride-amine hydrochloride to isocyanate and the chlorination or bromination of the aromatic ring takes place simultaneously with the formation of the isocyanate. The resulting product will preferably contain from about 0.5 to about 35 percent by weight of chemically combined chlorine and most preferably at least 5 percent of the chemically combined chlorine will be bonded to an aliphatic carbon atom, if any. Alternatively when both aromatic ring and side chain substitution are possible, a product containing a greater proportion of halogen substituted on the aromatic ring can be prepared by adding the halogen during the early stages of the cold phosgenation process. Depending on the amine, a catalyst such as $FeCl_3$ or $I_2$ may be desirable to facilitate the reaction.

Therefore, this invention contemplates halogenated organic polyisocyanates including those prepared by reacting an aromatic amine with an aldehyde or ketone such as, formaldehyde, acetaldehyde, propionaldehyde, butyraldehyde, n-heptaldehyde, benzaldehyde, cyclohexane aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like, in a first step to prepare a mixture of aromatic polyamines which are then phosgenated and chlorinated in a second step to prepare a mixture of aromatic polyisocyanates. It is preferred to use the aniline-formaldehyde reaction product as the aromatic amine and it is preferred in all cases, whether or not this is the amine used, to have from 0.5 to 15 percent by weight of chemically combined chlorine and/or bromine in the final product.

A preferred process of the invention involves phosgenating and chlorinating a reaction mixture prepared from 60 parts of aniline and 25 parts of formaldehyde by treating 85 parts of crude amine with 160 parts of phosgene until a product having an amine equivalent of about 140 and containing about 30 percent free —NCO is obtained. One first reacts the crude amine with an excess of phosgene at a temperature below about 60° C. until a carbamyl chloride-amine hydrochloride is obtained and then the resulting carbamyl chloride-amine hydrochloride slurry is reacted with further phosgene at a temperature close to the boiling point of the solvent or above about 90° C. and simultaneously with chlorine until the crude aromatic chlorinated polyisocyanate is obtained.

The temperature at which the chlorination or bromination takes place is important, if certain processing advantages are to be obtained. If the temperature of the reaction mixture is below 50° C., when the aromatic amine is reacted with chlorine or bromine, an unreasonable amount of splitting at the aliphatic sites, if any, on the aromatic ring may occur. This splitting is progressively diminished by increasing the temperature up to at least about 150° C. This splitting is particularly evident where a compound such as methylene dianiline is simultaneously phosgenated and chlorinated. However, when the temperature of the reaction mixture is above about 220° C., most of the isocyanate formed will react with itself to form polymers which are not useful and which are moreover largely solids. It is preferred to avoid this polymerization by having the temperature below about 175° C. The best results are obtained by having the temperature in the range of about 150° C. to about 170° C. during the reaction of the chlorine and/or bromine with the aromatic amines. The purpose of heating the reaction mixture is primarily to avoid the splitting out of monoisocyanates by reaction of the chlorine and/or bromine with the carbon in the aliphatic bridge, but a secondary effect is to direct the chlorine to the bridge. In view of this second effect, catalysts which promote the chlorine and/or bromine addition to aromatic carbon atoms may also be used even though catalysts are not necessary. Any of the conventional catalysts may be used such as, for example, ferric chloride and iodine.

For some amines which do not undergo splitting, it may be desirable to add the halogen during the early stages of the cold phosgenation step to take advantage of the high reactivity of the halogen with the amine and of the tendency of the halogen to substitute the ring rather than the aliphatic sites under these conditions. A preferred temperature range for the cold halogenation is from about 0° C. to about 20° C.

The preferred chlorinated and/or brominated aromatic polyisocyanates of the invention contain 0.5 to 10 percent by weight of chlorine and/or bromine. A most preferred mixture of aromatic polyisocyanates is based on aniline, formaldehyde or acetone, phosgene and chlorine reacted together in such proportions that from about 50 percent to about 80 percent of the product is an aromatic diisocyanate and the balance of the product is higher polyisocyanates, with total chlorine as above. Above 10 percent chlorine or bromine, the viscosity begins to go up and above 35 percent, the viscosity is unreasonably high for good mixing of the isocyanates with other components, for example, on foam producing equipment. It is preferred to have less than enough chlorine or bromine present to produce an isocyanate with a viscosity below about 1000 centipoises at 25° C.

The organic polyisocyanates of the invention may be used for the preparation of polyurethane foams, coatings, castings and the like. The products of the invention are useful where polyurethane plastics and organic polyisocyanates leading to the production thereof have been used heretofore. Thus, the products of the present invention are useful for the production of both sound and thermal insulation, gaskets, the potting of electrical components, bushings, the molding of the counter portion of shoes, shoe heels and the like.

The invention is further illustrated by the following examples in which the parts are by weight unless otherwise specified.

*Example 1*

About 120 mols aniline are added with cooling to maintain a temperature of about 75° C. to about 120 mols of 32 percent aqueous hydrogen chloride. To the resulting solution is added about 50 mols of formaldehyde (37 percent aqueous) while maintaining the temperature below about 90° C. The resulting mixture is maintained at about 90° C. to about 100° C. for about 3 hours. To this reaction product is charged about 122 mols of NaOH (50 percent aqueous solution). The reaction mixture separates into an oil phase and an aqueous phase. The aqueous phase is removed. The residual water and unreacted aniline is removed from the oil phase by distillation, starting at about 100° C. and reducing the pressure sufficiently to remove substantially all the unreacted aniline at a still temperature below about 250° C.

About 150 parts of crude amine thus obtained is mixed with about 1000 parts of monochlorobenzene to make an amine solution. About 300 parts of phosgene are dissolved in about 2000 parts of monochlorobenzene while keeping the temperature below about 15° C. The monochlorobenzene solution of the crude amine is then added slowly over a period of about 30 minutes while keeping the reaction mixture at a temperature of about 15° C. When the addition of the amine solution is complete, the reaction mixture is heated while adding additional phosgene at a rate of about 110 parts per hour until the temperature reaches about 125° C. Then the addition of dry chlorine at the rate of about 20 parts per hour is begun and continued for about 3 hours at a reflux temperature of about 135° C. The addition of chlorine and phosgene is stopped after about 3 hours and the reaction mixture is purged for about 45 minutes with dry nitrogen. The solvent is stripped off under vacuum and the product is cooled to room temperature for storage. The resulting isocyanate is a clear amber liquid at room temperature which has a total of 1.8 percent by weight of chlorine and 0.31 percent hydrolyzable chloride and an amine quivalent of 135.5.

*Example 2*

About 150 parts of a mixture of 20 percent 2,6-toluylene diamine and 80 percent 2,4-toluylene diamine are dissolved in about 1500 parts of ortho-dichloro-benzene. A separate solution is prepared which consists of about 500 parts phosgene dissolved in about 1500 parts of ortho-dichloro-benzene at a temperature of about 5° C. The amine solution is added to the phosgene solution with agitation at such a rate that the temperature of the mixture is kept below about 20° C. When the addition is complete, the reactor is slowly heated until the temperature reaches about 50° C. About 0.3 part of iodine is added as a catalyst and chlorine is fed to the reactor through an esparger at the rate of about 25 parts per hour for a period of about 3 hours. A second esparger is used to add more phosgene at the rate of about 50 parts per hour for a period of about 3 hours. The temperature of the mixture is raised to reflux during the early portion of the addition. Upon completion of the addition of chlorine and phosgene, nitrogen is blown through the mixture for about 30 minutes to remove excess phosgene and chlorine. The solvent is stripped under about 50 mm. Hg with final traces being removed under about 1 mm. Hg. The product contains approximately 11 percent by weight of chlorine and has an amine equivalent of about 115.

*Example 3*

About 150 parts of a mixture of 20 percent 2,6-toluylene diamine and 80 percent 2,4-toluylene diamine are dissolved in about 1500 parts of ortho-dichloro-benzene. A separate solution is prepared which consists of about 500 parts of phosgene dissolved in about 1500 parts of ortho-dichloro-benzene at a temperature of about 5° C. The amine solution is added to the phosgene solution along with about 75 parts of chlorine which is added through a separate esparger. The addition requires about 3 hours during which the temperature of the reaction mixture is kept below about 20° C. Upon completion of the addition, the reactor is slowly heated to about 50° C., and phosgene is fed to the reactor through an esparger at the rate of about 50 parts per hour for a period of about 2 hours. The temperature of the mixture is raised to reflux during the early portion of the addition. Upon completion of the addition of chlorine and phosgene, nitrogen is blown through the mixture to remove excess phosgene and chlorine. The solvent is stripped under about 50 mm. Hg with final traces being removed under about 1 mm. Hg. The total chlorine in the foregoing product is about 12 percent by weight and the amine equivalent is about 120.

It is to be understood that the foregoing working examples are given for the purpose of illustration and that any other suitable aromatic amine, aldehyde, ketone, halogen or the like could have been used provided that the teachings of this disclosure is followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for the preparation of halogenated aromatic polyisocyanates containing from 1 to 3 benzene rings which comprises reacting an aromatic polyamine containing from 1 to 3 benzene rings in a first stage with phosgene at a temperature below about 90° C. to prepare a carbamyl chloride-amine hydrochloride, reacting said carbamyl chloride-amine hydrochloride in a second stage with additional phosgene at a temperature within the range of from about 90° C. to about 175° C., with the proviso that chlorine or bromine and phosgene are reacted simultaneously with the aromatic polyamine or carbamyl chloride-amine hydrochloride in at least one stage of the process.

2. The method of claim 1 wherein chlorine is used.

3. The method of claim 1 wherein phosgene and chlorine are reacted simultaneously with said carbamyl chloride-amine hydrochloride in the second stage at a temperature of from about 150° C. to about 175° C.

4. The method for the preparation of halogenated aromatic polyisocyanates containing from 1 to 3 benzene rings which comprises reacting an aromatic polyamine containing from 1 to 3 benzene rings in a first stage with phosgene at a temperature below about 90° C. to prepare a carbamyl chloride-amine hydrochloride, and reacting said carbamyl chloride-amine hydrochloride in a second stage with additional phosgene and simultaneously with chlorine or bromine at a temperature with the range of from about 90° C. to about 175° C.

References Cited by the Examiner

UNITED STATES PATENTS

| | | | |
|---|---|---|---|
| 2,013,791 | 9/1935 | Sachs et al. | 260—694 X |
| 2,945,875 | 7/1960 | Tazuma | 260—453 |
| 3,098,862 | 5/1963 | Fetterly et al. | 260—453 X |
| 3,105,848 | 10/1963 | Linder et al. | 260—453 X |

CHARLES B. PARKER, *Primary Examiner.*

DALE R. MAHANAND, *Assistant Examiner.*